(No Model.)

J. C. LESLIE.
PORTABLE SAW TABLE.

No. 279,098. Patented June 5, 1883.

Witnesses.
Louis F. Gardner
J. W. Garner

Inventor.
Jos. C. Leslie
per
Chas. E. Allen,
atty.

UNITED STATES PATENT OFFICE.

JOSEPH C. LESLIE, OF ST. ALBANS, VERMONT, ASSIGNOR TO W. C. SMITH, OF SAME PLACE.

PORTABLE SAW-TABLE.

SPECIFICATION forming part of Letters Patent No. 279,098, dated June 5, 1883.

Application filed March 29, 1883. (No model.)

*To all whom it may concern:*

Be it known that I, JOSEPH C. LESLIE, a citizen of the United States, residing at St. Albans, in the county of Franklin and State of Vermont, have invented certain new and useful Improvements in Portable Saw-Tables, of which the following is a specification, reference being had therein to the accompanying drawings.

My invention relates to improvements in saw-tables designed more especially to be used in connection with portable motive powers; and the objects of my improvements are, first, to provide a support for the saw-arbor which shall be portable, and, secondly, to afford facilities for conveniently handling and moving the table or adjusting it to the motive power, as may be desired. I attain these objects by the mechanism illustrated in the accompanying drawings, in which—

Figure 1:
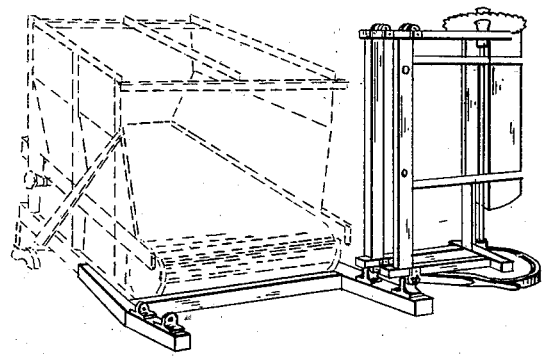
Figure 2:
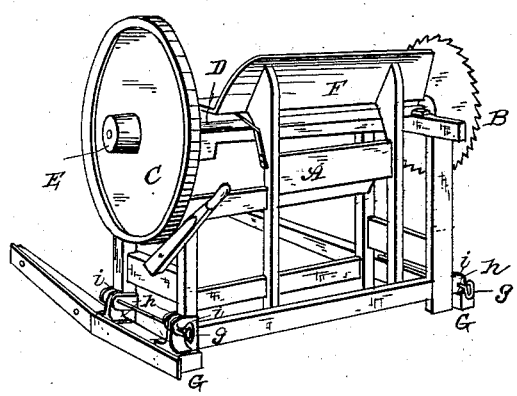

Figure 1 is a perspective view of the entire apparatus; Fig. 2, the same, showing the mode of moving the saw-table.

Similar letters refer to similar parts throughout the several views.

A is the table-frame, designed to sustain the saw B and its balance-wheel C. D is the saw-arbor; E, the driving-pulley, and F the trough for carrying the stick to be cut. G G are sills designed to be firmly attached to the lower ends or legs of the table A by means of rods $g\ g$, which pass through holes drilled in ears $h\ h$ on the upper side of the sills G G, and corresponding eyes, $i\ i$, in the lower ends of the legs of the table A. The hinge connection thus formed between the table A and the sills G G enables the operator to readily move the table away from the power or to transport it to another position by withdrawing either one of the rods $g\ g$, according to convenience, and tipping it laterally over upon its opposite end or upon a truck, when by withdrawing the remaining rod $g$ the table, being detached from the sills G G, can be readily carried wherever desired, and the sills again attached to it by placing the eyes $i\ i$ between the corresponding ears, $h\ h$, so that when the rods $g\ g$ are passed through them the table A is again firmly attached to the sills, ready for work. If, for instance, it is desired to run the saw by horse-power, the sills G G are made to project forward for the purpose of being bolted to the sills on each side of the rear end of the power, and thus hold the table A rigidly in place without requiring any additional fastening. Free access to the horse-power is readily obtained by simply withdrawing the rod $g$ at one end of the table, and then tipping the table over onto its opposite end, after which the table can be returned to position and securely fastened to the sill by replacing the rod $g$, which had been withdrawn. As the table is then rigidly connected with the power, the belt can be readily adjusted to the pulley E, and no ordinary force can affect the position of the table A. By this arrangement of pivoting the table to sills which can be extended so as to be firmly attached to the motive power, a great amount of time and labor usually required for temporarily moving a saw-table, or subsequently firmly fixing its position whenever a change in place becomes necessary, is almost wholly saved, as the hinge device admits of the table being both instantly tipped laterally, or afterward returned to the same relative position, ready for an immediate adjustment of the belt of the motive power, and for the work it is intended to perform.

What I claim, and desire to secure by Letters Patent, is—

1. In a portable saw-table, the combination of the sills G, provided with perforated ears $h$, and the table provided with legs, having eyes formed in lugs extending from said legs, and rods $g$, substantially as described, whereby the table may be swung upward from one end or disconnected from the sills, for the purpose set forth.

2. The saw-table A, provided with eyes upon its legs, adapted to be connected with corresponding drilled ears by movable rods $g\ g$, in combination with the extension-sills G G, substantially as described.

In testimony whereof I affix my signature in presence of two witnesses.

JOSEPH C. LESLIE.

Witnesses:
NELSON C. HYDE,
W. TRACY SMITH.